(12) United States Patent
Chesla et al.

(10) Patent No.: US 10,673,903 B2
(45) Date of Patent: Jun. 2, 2020

(54) CLASSIFICATION OF SECURITY RULES

(71) Applicant: Empow Cyber Security Ltd., Ramat Gan (IL)

(72) Inventors: Avi Chesla, Brookline, MA (US); Shlomi Medalion, Lod (IL)

(73) Assignee: Empow Cyber Security Ltd., Ramat Gan (IL)

( * ) Notice: Subject to any disclaimer, the term of this patent is extended or adjusted under 35 U.S.C. 154(b) by 0 days.

(21) Appl. No.: 16/179,216

(22) Filed: Nov. 2, 2018

(65) Prior Publication Data

US 2019/0081986 A1 Mar. 14, 2019

Related U.S. Application Data

(63) Continuation of application No. 15/182,827, filed on Jun. 15, 2016, now Pat. No. 10,122,762.

(51) Int. Cl.
*H04L 29/06* (2006.01)
*G06F 21/60* (2013.01)
(Continued)

(52) U.S. Cl.
CPC ........ *H04L 63/20* (2013.01); *G06F 16/24575* (2019.01); *G06F 16/285* (2019.01);
(Continued)

(58) Field of Classification Search
CPC ........... H04L 29/06986; H04L 63/0227; H04L 63/105; H04L 63/1416; H04L 63/1441;
(Continued)

(56) References Cited

U.S. PATENT DOCUMENTS 7,933,989 B1 4/2011 Barker et al.
8,150,783 B2 4/2012 Gonsalves et al.
(Continued)

OTHER PUBLICATIONS

H. Yang and S. Fong, "Optimized very fast decision tree with balanced classification accuracy and compact tree size," The 3rd International Conference on Data Mining and Intelligent Information Technology Applications, Macao, pp. 57-64 (IEEE 2011) (Year: 2011).*

(Continued)

*Primary Examiner* — Theodore C Parsons
(74) *Attorney, Agent, or Firm* — M&B IP Analysts, LLC

(57) ABSTRACT

A system and method for method for generating a security rule classification model comprises receiving at least one security rule from at least one attack database of a first security product of a plurality of different security products; normalizing each of the at least one security rule; generating a vector for each of the least one normalized security rule; classifying each generated vector to a security engine within a security service using a classification sub-model to generate a preliminary classification model, wherein the classification sub-model is provided from previous classification of security rules for a security product of the plurality of different security products that is different than the first security product; determining a score for the preliminary classification model; and validating the preliminary classification model as the security rule classification model, when the score is over a predefined threshold.

20 Claims, 6 Drawing Sheets

(51) Int. Cl.
  *G06F 21/55* (2013.01)
  *G06F 16/28* (2019.01)
  *G06F 16/9535* (2019.01)
  *G06F 16/2457* (2019.01)

(52) U.S. Cl.
  CPC ........ *G06F 16/9535* (2019.01); *G06F 21/554* (2013.01); *G06F 21/604* (2013.01); *H04L 63/0227* (2013.01); *H04L 63/105* (2013.01); *H04L 63/1416* (2013.01); *H04L 63/1441* (2013.01)

(58) Field of Classification Search
  CPC . H04L 63/20; G06F 16/24575; G06F 16/285; G06F 16/9535; G06F 21/554; G06F 21/577; G06F 21/604; G06N 20/00; G06N 20/10
  See application file for complete search history.

(56) References Cited

U.S. PATENT DOCUMENTS

| | | |
|---|---|---|
| 8,572,750 B2 | 10/2013 | Patel et al. |
| 8,800,045 B2 | 8/2014 | Curtis et al. |
| 9,680,846 B2 | 6/2017 | Haugsnes |
| 2003/0217033 A1 | 11/2003 | Sandler et al. |
| 2004/0114519 A1 | 6/2004 | MacIsaac |
| 2004/0143756 A1 | 7/2004 | Munson et al. |
| 2005/0049990 A1* | 3/2005 | Milenova ............ G06F 16/284 706/48 |
| 2012/0096549 A1 | 4/2012 | Amini et al. |
| 2012/0263376 A1* | 10/2012 | Wang .................. G06K 9/6256 382/160 |
| 2012/0304007 A1 | 11/2012 | Hanks et al. |
| 2013/0198840 A1 | 8/2013 | Drissi et al. |
| 2013/0276122 A1 | 10/2013 | Sowder |
| 2014/0215618 A1 | 7/2014 | Amit |
| 2014/0280166 A1 | 9/2014 | Bryars et al. |
| 2014/0283026 A1 | 9/2014 | Amit et al. |
| 2014/0283050 A1 | 9/2014 | Amit |
| 2014/0337974 A1 | 11/2014 | Joshi et al. |
| 2016/0212166 A1 | 7/2016 | Henry et al. |
| 2016/0212167 A1* | 7/2016 | Dotan .................... H04L 63/20 |
| 2017/0018075 A1* | 1/2017 | Middlebrooks ........ A61B 6/502 |
| 2017/0091673 A1* | 3/2017 | Gupta .................... G06N 5/022 |
| 2017/0116544 A1* | 4/2017 | Johnson ................. G06N 7/005 |
| 2018/0027006 A1* | 1/2018 | Zimmermann ..... H04L 63/0245 726/11 |

OTHER PUBLICATIONS

The International Search Report and the Written Opinion of the International Searching Authority for PCT/US2015/039664, ISA/RU, Moscow, Russia, dated Oct. 15, 2015.

The International Search Report and The Written Opinion of the International Searching Authority for PCT/US2015/060109, ISA/RU, Moscow, Russia, dated Mar. 10, 2016.

* cited by examiner

CLASSIFICATION OF SECURITY RULES

CROSS-REFERENCE TO RELATED APPLICATIONS

This application is a continuation of U.S. patent application Ser. No. 15/182,827 filed on Jun. 15, 2016 the contents of each of which is hereby incorporated by reference.

TECHNICAL FIELD

The present disclosure relates generally to cyber security systems, and more particularly to classification of different security rules to security services and security engines of each service.

BACKGROUND

The Internet provides access to various pieces of information, applications, services, and vehicles for publishing information. Today, the Internet has significantly changed the way we access and use information and services (e.g., banking, e-commerce, e-trading, and the like). In order to access such services, users often share personal information with service providers. Similarly, confidential information of companies is stored on systems that are connected to the Internet.

Recently, the frequency and complexity level of cyber-attacks has increased with respect to attacks performed against all organizations including, but not limited to, cloud providers, enterprises, organizations, and network carriers. Some complex cyber-attacks, known as advanced persistent attack campaigns, utilize different types of attack techniques and target network, application, and end-point resources in order to achieve the attack's goals, thereby compromising the entire security framework of the network. The intention of an advanced persistent attack campaign is usually to steal data rather than to cause direct damage to the network or organization. These attacks typically target organizations in sectors with high-value information such as the national defense, manufacturing, retail, and financial industries.

To secure their systems, infrastructure, and services, enterprises utilize many different security products provided by different vendors. Typically, such products are utilized to detect and/or mitigate different vulnerabilities or threats. As an example, an enterprise network can implement one security product for an intrusion detection system (IDS) and another product for detecting malware download. Particularly, a typical enterprise network will be protected by firewalls, anti-virus software, malware detection software, authentication and authorization systems, intrusion detection, anti-phishing systems, network and end point behavior analysis, data leak prevention systems, web application firewalls (WAFs), and so on.

The security products are typically deployed in different segments of the enterprise network, e.g., at different servers, end-points (client computers), at networks, and so on. Further, different products, provided by different vendors, for protecting against the same type of threat can be typically utilized in combination to enhance the security. For example, IDS software provided by both Cisco® and McAfee® can be installed to protect end-points and servers in the enterprise network.

Security products typically utilize network behavior rules, attack signatures, malware and virus patterns and the like (collectively referred to as "security rules") to detect and/or mitigate a threat. Examples for such security rules include, e.g., IDS network attack signatures rules, anti-virus and malware patterns, reputation threat records, WAF rules, network behavior analysis rules, and so on. Each such rule is typically specific to a vendor providing the solution.

One of the challenges security architects and managers face is the multiplicity of security products and vendors. Each such product has a unique interface and implements a different type of technology, configurations, debug methods, and different security rules. The myriad of different security solutions and, specifically, their security rules pose a great challenge to protecting an enterprise network from cyber-attacks. Other than the complexity in configuring and monitoring the different solution, there is a real challenge to understand the effectiveness of each security rule and, consequently, each solution. That is, it cannot be easily determined which solution, for example, is better over the other to detect a specific type of threat.

Consequently, integrating new solutions is complex and time consuming, and requires a large security team with extensive expertise to master product complexity. Obviously, the administrative and maintenance labor comes at the expense of the design security defenses.

As a result, trying to enforce an overall effective security policy for the enterprise network is a very difficult task given the different nature of security rules. For example, assuming two IDS products are deployed in the network, and one detects a threat while the other does not. As such, there is an ambiguity as to whether the threat is real. Therefore, current solutions are inefficient when utilized to enforce an overall security policy.

In addition, the reliance on a specific security product typically discourages administrators to replace one product with another. Because, typically in the chain of enforcing an overall security policy, an input of one product is an output security rule of another product. Therefore, replacing one such product in the chain would require replacing or at least reconfiguring of other products.

Another challenge posed by the myriad of security products is that their security rules are frequently updated. Thus, such rules can be classified a-priori (e.g., mapped into different threat groups, representing different threats types each group if rule was meant to address), which at best, can be accurate until the next update. Further, a single security product can contain thousands of and more security rules. Thus, manual classification of all rules across all products is a tedious and time-consuming task.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some disclosed embodiments include a method for classifying security rules of a plurality of different security products into a security decision engine in a service. The method comprises receiving at least one security rule from at least one attack database of a security product of the plurality of different security products; normalizing each of the at least one security rule; generating a vector for each of the least one normalized security rule, wherein each vector is generated based on a set of terms indicative of a cyber-solution; mapping each of the generated vector to a security service, wherein the security service represents a cyber-solution category, wherein the mapping is performed using a classification model; and associating each of the respective security rule with the security service, when an evaluation threshold is met.

Some disclosed embodiments also include a system for classifying security rules of a plurality of different security products into a security decision engine in a service. The system comprises a processing system; a memory communicatively connected to the processing system, wherein the memory contains instructions that, when executed by the processing element, configure the processing system to: receive at least one security rule from at least one attack database of a security product of the plurality of different security products; normalize each of the at least one security rule; generate a vector for each of the least one normalized security rule, wherein each vector is generated based on a set of terms indicative of a cyber-solution; map each of the generated vector to a security service, wherein the security service represents a cyber-solution category, wherein the mapping is performed using a classification model; and associate each of the respective security rule with the security service, when an evaluation threshold is met.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
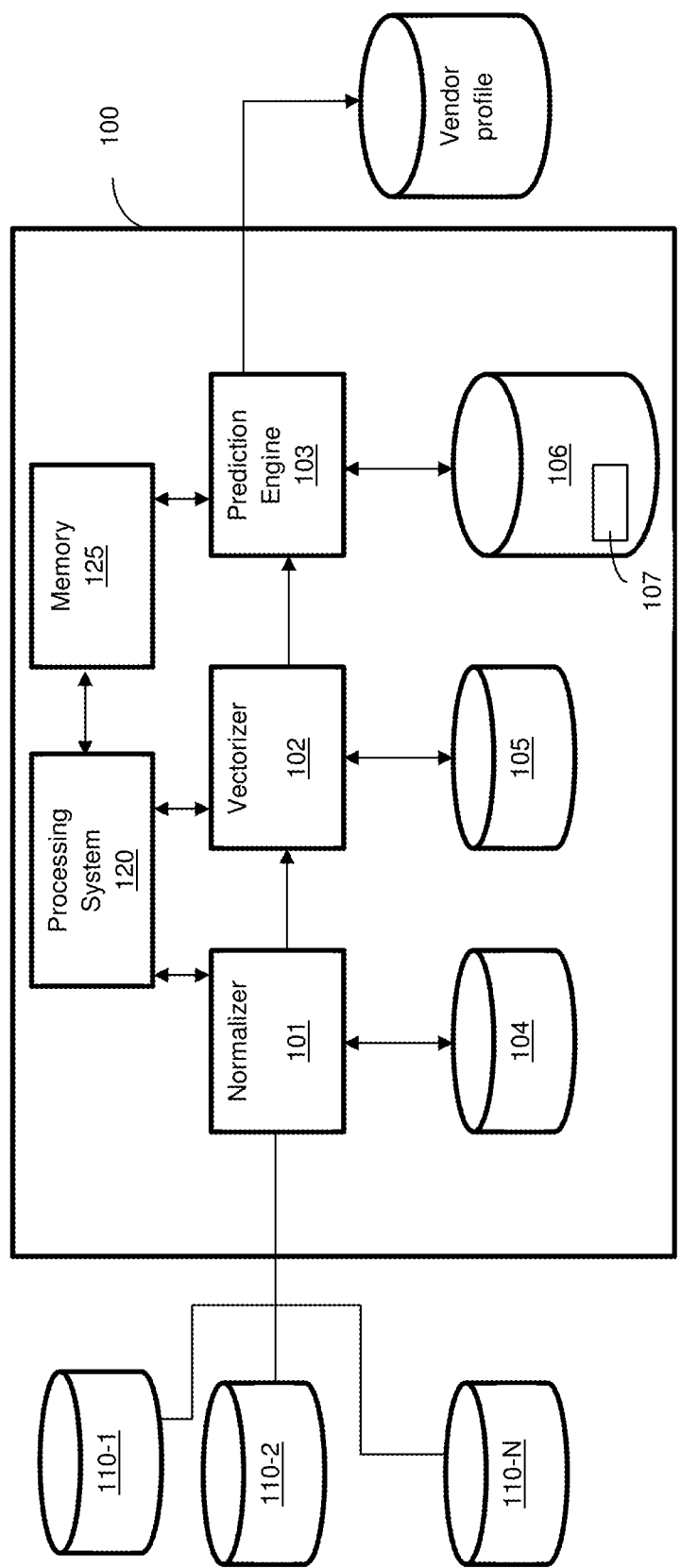
FIG. 1 is a block diagram of a security rules classifier implemented according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, a method and system for classifying security rules of different security products into security services are provided. A security service is a logical entity representing collections of logical security functions that are provided by a cyber-solution category. Each such category typically utilizes different type of security technologies and thus supports different types of attack detection, attack investigation and attack mitigation rules. Thus, according to an example embodiment, security rules of the same security solution category, provided by different vendors are classified to the same security service.

In another embodiment, the security rules classification operates on databases (hereinafter "attack databases") that store or maintain the security rules. The classification is performed on existing security rules, their updated versions, and/or new rules added to the attack databases.

In an example embodiment, a security service provides a unified representation of security rules which is agnostic to the different products and/or vendors. The unified representation, and thus the security service, can be utilized in a security application that protects the overall enterprise network without being dependent on a specific security product. That is, one security product can be replaced by another without changing or reconfiguring such security application.

FIG. 1 shows an example block diagram of a classifier 100 configured to classify security rules to security services according to an embodiment. The security rules are of a plurality of different security products. In an embodiment, discussed in more detail below, a security service can be executed or evaluated by one or more preconfigured security engines. The security engines, and therefore the security services, allow a cyber-security system to dynamically adapt new or modified security rules identifying new threats, new attack behaviors, unknown behaviors, or attacks that utilize new evasion techniques.

In an embodiment, the classification of each rule is for a security service and an engine configured to handle a specific cyber-solution category. For example, a rule can be classified to an intrusion detection system (IDS) service and a "propagation" security engine preconfigured, e.g., to identify malware propagation network activity.

Other security services may include, but is not limited to, a network anomaly behavior security service, a user application anomaly behavior security service, an anti-malware security service, a reputation security service, IDS security service, a challenge-response security service, an anti-virus (AV) security service, and a Web application (WAF) security service.

A plurality of attack databases 110-1 through 110-N (hereinafter referred to individually as an attack database 110 and collectively as attack databases 110, merely for simplicity purposes) are connected to the classifier 100. Each attack database 110 includes a set of security rules of a specific security product. In an embodiment, the databases 110 are of different products utilized to collectively handle a family of cyber threats and can belong to different solution categories (e.g., database in solution categories such as IDS, anti-virus, DLP, Web Application Firewall, Network Behavior Analysis etc.) of a cyber threat (hereinafter a "cyber-solution"). In another embodiment, the databases 110 are of different products utilized to handle different types of cyber threats. As noted above, each cyber-solution is mapped to a different security service.

Following are non-limiting examples for cyber-solutions and associated rules stored in their databases 110. The cyber-solution is an anti-virus system and the respective security rules may include virus file patterns generated by anti-virus products, such as those provided by McAfee®, Symantec®, Blue Coat®, and the like. The cyber-solution is an IPS or IDS and the respective rules are attack signatures generated by products such as those provided by Source Fire®, McAfee®, Snort®, and the like. The cyber-solution is an anti-malware system and the respective rules are known anti-malware rules as provided by tools provided by FireEye®, Lastline®, and the like. The cyber-solution is a firewall and the respective rules are network access rules generated by products from vendors, such as Check Point®, PaloAlto Networks®, Fortinet®, and the like.

In an embodiment, the classification is performed per each option of a cyber-solution. For example, a cyber-solution of an IDS with a "network scan" protection would be an option. Thus, all security rules related to a network scan type of threat of the different security products are classified to the same service and a network scan security engine of this service.

The contents of the attack databases 110 can be dynamically updated. Such an update typically occurs when new threats (e.g., new attack patterns) are identified or when rules stored in the databases 110 are no longer relevant because, for example, the rules represents an attack attempt which cannot any longer exploit any existing vulnerability in a software, as the software was patched by its vendor a long time ago. The update of the attack databases 110 is provided by the vendors of the security products.

In an example embodiment, the classifier 110 includes a normalizer 101, a vectorizer 102, and a prediction engine 103. The normalizer 101 is communicatively connected to a database 104 including metadata of security rules' fields and their respective weights. The vectorizer 102 is communicatively connected to a database 105 that includes a vocabulary of indicative terms commonly use to describe one or more types of cyber threats, and a vector's index assigned to each indicative term. The indicative terms and their indexes are utilized during the classification process. The prediction engine 103 is communicatively connected to a database 106 containing at least a trained classification model for classifying security rules to security engines of a security service. The database 106 may also include white and black lists of security rules for a security engine.

In an embodiment, the databases 104, 105, and 106 may be internal or external to the classifier 100. The databases 104, 105, and 106 may be realized using any storage or computer readable medium. Alternatively, some or all of the databases can be realized as a data structure (e.g., files) saved in common memory. In another embodiment, the contents of one, some, or all of the databases 104, 105, and 106 are provided as an input to the classifiers.

The normalizer 101 is configured to retrieve security rules from the attack databases 110 and transform such rules into a unified format. In an embodiment, the normalizer 101 is configured to retrieve only certain fields from each security rule. The retrieved fields can be those having a respective weight above a predefined threshold. A weight of a field determines a level of influence that an indicative term, which is contained in that field, would have on the classification process. The fields' weights are part of the metadata saved in the database 104. In an embodiment, such metadata is generated responsive to previous classification process(es) and/or user inputs related to previous knowledge.

As an example for an IDS cyber-solution, a security rule may include the fields of: an ID, an attack name, an attack summary, attack risk level, an attack impact level, an attack impact description, a threat description; a signature or a pattern; an attack signature release date; affected systems and versions; attack signature contributors; port numbers, and the like. The fields of attack signature release date and version are typically assigned with low weight. High weight fields such as an attack summary and attack impact may be assigned with high weights as their contents (i.e., indicative terms found in these fields) should be more dominant in the classification process. In an embodiment, fields without any assigned weights are ignored.

The normalizer 101 is further configured to normalize the contents of the retrieved fields. In an embodiment, the normalizer 101 may be configured to, for example, convert all letters in one security rule into a single representation (e.g., lowercase); remove stop-words which are not indicative of the security rule and/or threat (e.g., words such as "and," "it," "in," and "under" are considered stop words), stemming words having the same root (e.g., the words "programmer" and "programmable" have the same root "program"). The output of the normalizer 101 is a normalized string representing a security rule retrieved from the attack database 110.

The vectorizer 102 is configured to transform each normalized string into a quantitative vector of values. In an embodiment, prior to computing the values the unigrams, bigrams, and/or trigrams of the stemmed words are analyzed (or identified) by the vectorizer 102 and added to the vector of values. The unigrams, bigrams, and/or trigrams are added respective of the weight's assigned to the field.

In an embodiment, the value is computed based on the appearance of indicative terms in the normalized string. That is, the value is proportional to a level of appearance of the term in the rule. The values in the vector can be either numeric or binary values. The numeric values can be computed, for example, by using a term-frequency (TF) method, a term-frequency inverse document frequency (TF-IDF) method, and the like. Such methods compute a numerical statistic intended to reflect how important a term is in a snippet of text. In order to provide an accurate classification, the frequency of only indicative terms in the normalized string is computed. The indicative terms, and their index in the vector, are designated in the threat vocabulary database 105.

The binary values in the normalized vectors are determined based on the existence of indicative terms in the normalized string. Each indicative term found in the normalized string is assigned with a value of binary value of '1' while other term with a binary value '0'. The output vector, in its binary representation, can also be normalized including a sequence of '0' values (if any) and '1' values (if any).

It should be noted that each vector output by the vectorizer 102 corresponds to a single security rule. Thus, for 'm' (m is an integer greater than 1) processed security rules, the output of the vectorizer 102 would be a matrix of 'm' columns, i.e., number of rules, and 'r' rows is the score of each indicative term.

The prediction engine 103 is configured to map each column (representing a rule vector) in the input matrix (from the vectorizer 102) to respective security engine of a security service. The mapping is performed using a classification model 107 stored in the database 106.

In another embodiment, the classification model 107 is a vector defined by a set of weights. In an example, the weights are either positive or negative values indicating the probability that a term will be mapped to a specific security engine of a service. Positive and negative weight values indicate high and low probabilities respectively.

Figure 2:
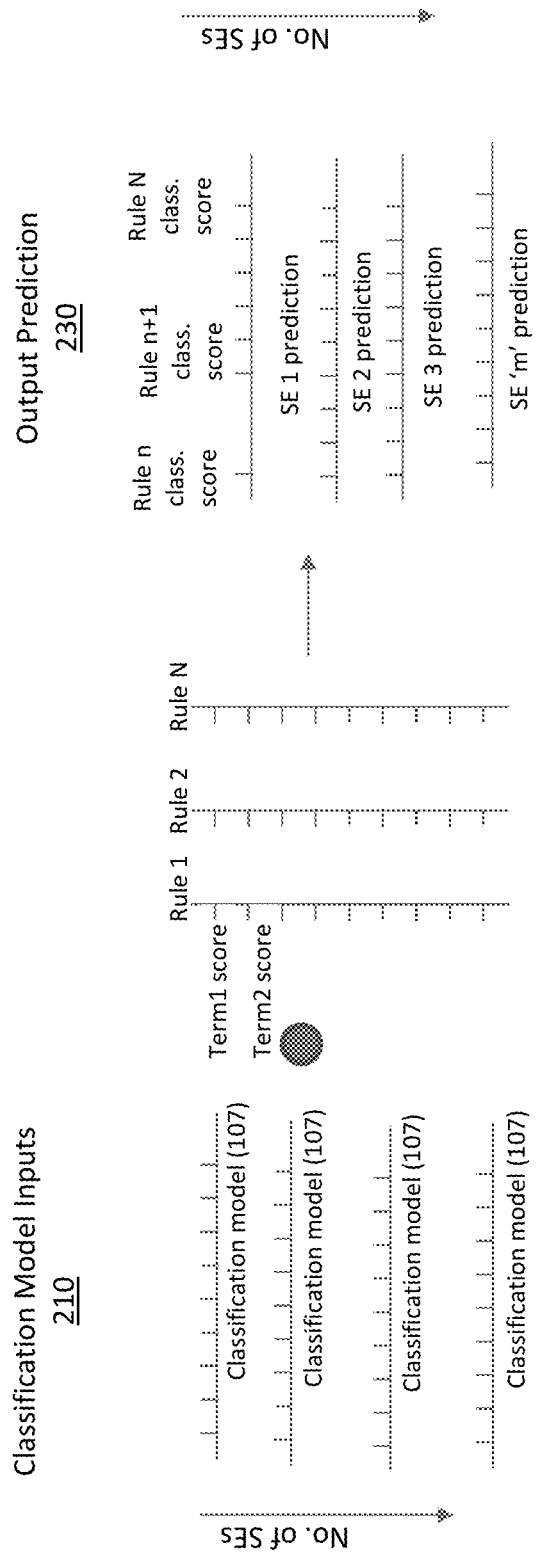
FIG. 2 is a schematic diagram illustrating a classification model.

The mapping process as performed by the prediction engine 103 is further demonstrated in FIG. 2. The classification model inputs 210 includes 'n classification models, each of which for a specific security engine (SE). The inputs are applied on the vectorized vectors 210, output by the vectorizer 102. The output 230 is of the predication engine 103 in which each column defines a rule and classification score when mapped to a security engine SE. In an embodiment, the prediction engine 103 is configured to apply the classification model 107 in the input matrix and to compute a classification score for each vector in the matrix (i.e., for each rule). The score indicates if a vector (a rule) can be classified into a security engines of a services designated in the classification model 107. In an embodiment, the classification score of each vector can be computed using a machine learning metric. Examples for such metrics include root mean square error (RMSE), mean absolute error, F-score, and the like. Classification of each security rule having a classification score below a certain threshold is ignored.

In an embodiment, the association of vectors to security engines based on the computed score is further checked against the black and white lists of security rules. Both the white and black lists are created per security engine. The white list of security rules lists all known rules that at a high certainty can be associated with a specific security engine. The black list includes security rules that cannot be associated with a security engine. In an optional embodiment, the check includes computing a percentage of "white list rules" that cannot be recognized using the classification model 107. If such percentage is higher than a predefined threshold (e.g., 5%) a message may be generated indicating that the result of the engine 103 is inaccurate. In an embodiment, the check includes computing the percentage of "black list rules" being recognized using the classification model 107 for particular security engine. If such percentage is higher than a predefined threshold (e.g., 5%) a message may be generated indicating the prediction process is inaccurate.

The accuracy in the results of the prediction engine 103 is based in part on the accuracy of the classification model 107. The classification model 107 is generated based on previous classification process(es) and/or prior knowledge input by a user. A detailed discussion for generating the classification model 107 is provided below.

The output of the classifier 100 is a list of security rules associated with to at least one security engine within each security service. In an example embodiment, the output is formatted as a two-dimensional matrix. Each row vector in the matrix includes scores per rule that characterizes the level of association of the rule to a security engine (such that the number of rows represent the number of security engines and the number of columns is set according to the number of rules). In an embodiment, the classified security engine can be grouped as a security product profile. Such profiles can be utilize to determine the efficacy of each security product in detecting and/or investigating a threat associated with the security engine (e.g., network scan engine, malware propagation engine, brute force attacks engine etc.).

In an embodiment, the classifier 100 can be implemented in software, firmware, hardware or any combination thereof. When implemented in hardware or as combination hardware and software/firmware, the classifier 100 includes a processing system 120 coupled to a memory 125. The processing system 120 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The memory 125 may be any machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing system, cause the processing system to perform the various rules described herein for classifying security rules.

Furthermore, the normalizer 101, the vectorizer 102, and/or the prediction engine 103 may be realized as a processing system having the configuration discussed above. The databases 104, 105, and 106 can be realized as a storage device, such as a magnetic storage, optical storage, a Flash memory or other memory technology, or any other medium which can be used to store the desired information.

Figure 3:
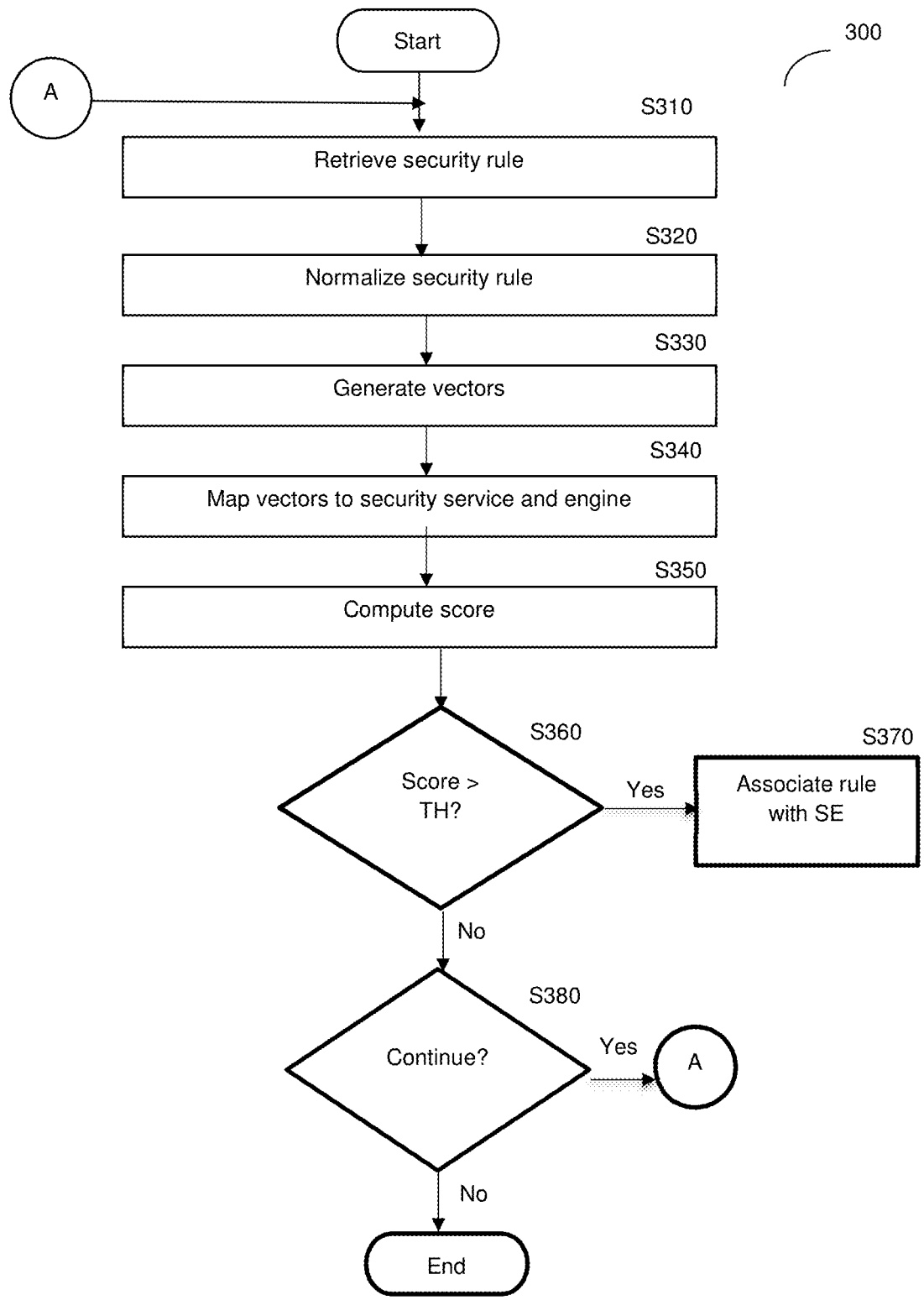
FIG. 3 is a flowchart illustrating a method for classifying security rules to security services according to an embodiment.

FIG. 3 is an example flowchart 300 of a method for classifying security rules to security engine within a security service according to an embodiment. At S310, a security rule is retrieved from an attack database. In an embodiment, only certain fields of a security rule are retrieved. Specifically, the retrieved fields include information that can result in a unique classification. Further, the retrieved fields may be determined based on weights assigned to such fields.

At S320, the retrieved security rule is normalized to result in a normalized string representing the security rule. Specifically, as discussed in detailed below, the normalization includes converting all letters in each retrieved field security rule into a single representation (e.g., lowercase); removing stop-words which are not indicative of the security rule and/or threat; and/or stemming words having the same root.

Following is an example for the normalization step. The field of a retrieved security rule is "summary" having the following description:

A web command execution attack involving the use of a "NMAP" command

First the word "NMAP" will be converted to a lowercase word "nmap". Then, stop-words "A", "the", "of" "will" and "be" are removed. The words "execution", and "involving" are stemmed to "execute" and "involve", respectively. The results normalized string would be:

"web command execute attack involve use namp command";

The normalized string may be then duplicated or repeated a few times depending on the importance of the field for the classification process. For example, the final string can be represented as follows:

"web command execute attack involve use"

Or a duplicated string

"web command execute attack involve use namp command web command execute attack involve use""

At S330, a vector representing the security rule is generated based on the indicative terms found in the normalized string. The indicative terms are retrieved from a threat vocabulary database (e.g., database 105). As noted above, the vector can be computed as a set of binary or numeric values. For example, if the indicative terms may be retrieved from the database 105 in the following format {"nmap":1, "scan":2, "operating system":3, "icmp":4, "ping":5} which determines that the output vector would include only 5 entries, where the first element corresponds to presence of the term "nmap" in string, the second element corresponds to presence of the term "scan", and so on. In this example, the indicative terms are: "nmap", "scan", "operating system", "ICMP", and "ping" and the normalized string is as indicated above, a binary vector would be:

"1 0 0 0 0"

It should be noted that for ease of the discussion and understanding of the various embodiments, the provided example is only for one field in a security rule. A typical rule includes multiple fields.

At S340, a generated vector is mapped to a security engine of a service. The mapping is performed based on a classification model (e.g., model 107). Such mapping may be statistical, deterministic, or heuristics mapping. As noted above, such classification which is created per each security engine). In an embodiment, the rules including one or more indicative terms in common will be mapped (or classified) to the same security engine of a service).

To demonstrate the operation of S340, the following security rules will be mapped to "network scan" security engine within the IDS security service. It should be noted that rules demonstrated herein are not presented in their normalized and vectorized representations merely for simplicity purposes and without limitation on the disclosed embodiments.

A security rule (security rule 1) from a security product A of a vendor X may be:
name: web-attacks nmap command attempt
summary: A web command execution attack involving the use of a "nmap" command impact: Possible intelligence gathering activity.
Detailed Description: The attacker may have gained the ability to execute system commands remotely or the web server may be incorrectly configured to allow such access. This rule generates an event when a "nmap" command is used over a plain-text (unencrypted) connection on one of the specified web ports to the target web server. The "nmap" command may be used to discover open ports, services and operating system information on hosts. The rule looks for the "nmap" command in the client to web server network traffic and does not indicate whether the command was actually successful. The presence of the "nmap" command in the URI indicates that an attacker attempted to trick the web server into executing system in non-interactive mode i.e. without a valid shell session.

A security rule (security rule 2) from a security product B of a vendor X may be:
name: scan nmap TCP
summary: This event is generated when the nmap port scanner and reconnaissance tool is used against a host.
impact: This could be part of a full scan by nmap and could indicate potential malicious reconnaissance of the targeted network or host.
Detailed description: Some versions of nmap TCP ping, if selected, sends a TCP ACK with an ACK number=0. nmap can use TCP ping as a second alternative to icmp ping.

A security rule (security rule 3) from a security product C of vendor Z may be:
name: scan: Possible CyberCop OS Probe3
impact: Reconnaissance
description: This alert indicates that there is a potentially malicious attempt to identify the OS on a target host using TCP packets. This alert is triggered by TCP packets with SYN+FIN+URG flags, possibly caused by a scan event. All systems with a TCP/IP stack are vulnerable to this. A remote attacker could identify the operating system of a host based on how it reacts to some IP or ICMP packets, using a tool such as NMAP or Queso. The results of a scan by this utility could provide an attacker information about the weaknesses of your network and systems.

The indicative terms are for a network scan type of threat are "nmap", "scan", "operating system", "ICMP" and "ping". As both rules include the indicative terms "nmap" and "operating system", these rules are mapped to network scan security engine within the IDS security service.

At S350, a classification score is computed. As noted above, the classification score indicates the accuracy of the classification (e.g., the probability that the rule was correctly mapped to a security engine). In an optional embodiment, S350 may include computing a percentage of "white list rules" and/or "black list rules" in order to verify the classification results. The percentage of the "white list rules" and/or "black list rules" may be computed only when the number of classified rules are above a certain threshold.

At S360, it is checked if the classification score and/or one or both of the white list and black list percentages is equal to or greater than a respective predefined threshold (TH). If so, execution continues with S370; otherwise, execution continues with S380. At S370, the security rule is associated with a security engine. Such association may be based in a database and/or provided to a security engine. Otherwise, the classification is ignored.

At S380, it is checked if there are additional security rules to classify. If so, execution continues with S310; otherwise, execution terminates.

The classifier 100 is configured to operate online or in real-time, i.e., continuously during the ongoing operation of the cyber security system. This allows for classification of new or modified security rules as they are released by vendors without any required update to the classification model 107. The classification model 107 is typically developed during an offline process and uploaded to the classifier 100 once ready.

In an embodiment, a plurality of classification models may be utilized, each of which relates to a different category of a cyber-solution (classified as security service). A classification model is generated based on rules collected from different security products of the same cyber-solution category. A new classification model may be created when a new product for a cyber-solution is identified and/or when a cyber-solution category is added. However, it should be noted that that an existing classification model can serve for classification of new products of the same category as well.

Figure 4:
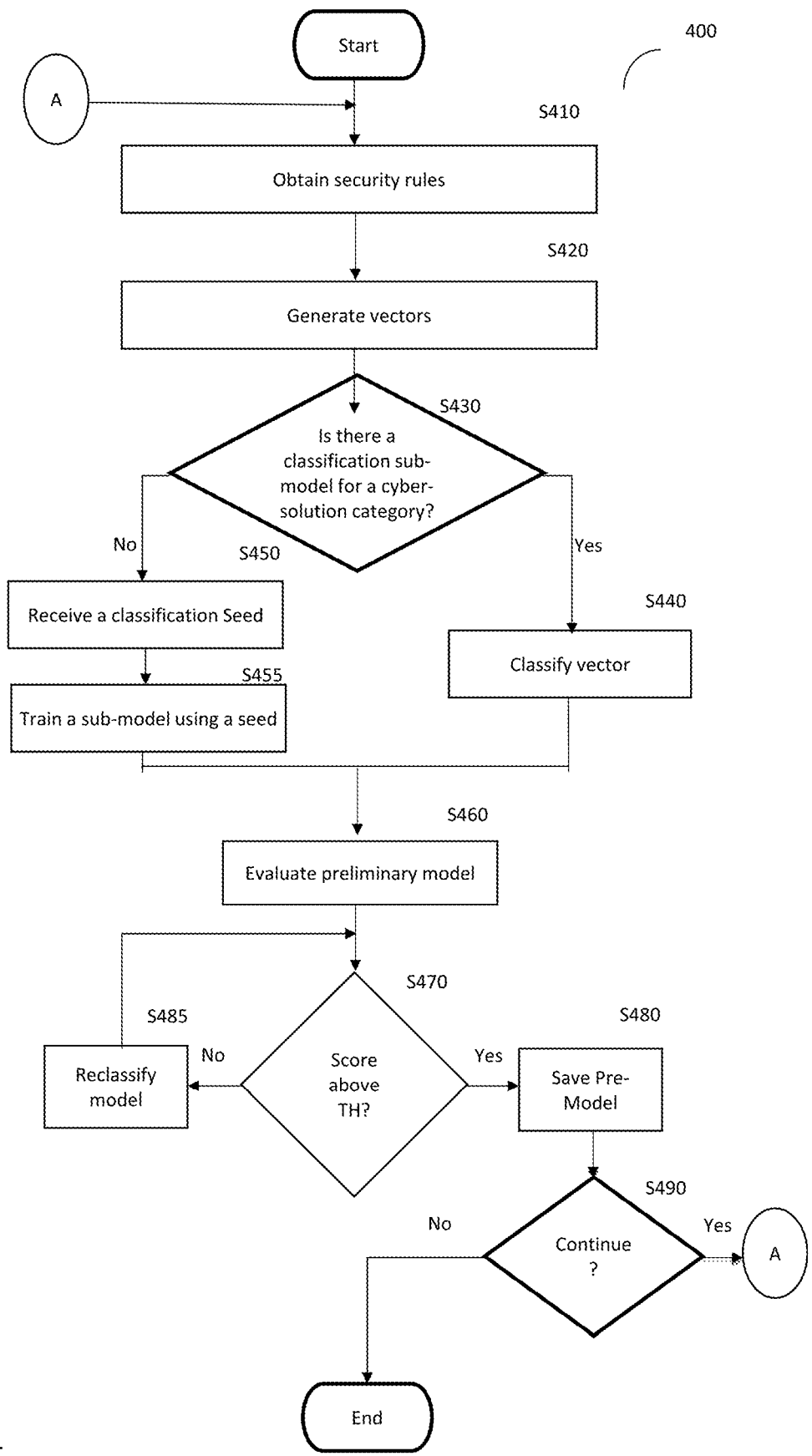
FIG. 4 is a flowchart illustrating a method for generating a classification model according to an embodiment.

FIG. 4 is an example flowchart 400 illustrating a method for generating a classification model according to an embodiment. At S410, security rules are obtained from an attack database of one security product. The security product, and hence the attack database, may be selected based on a cyber-solution category.

At S420, each obtained security rule is normalized and vectorized as discussed in detail below. Specifically, the output of S420, for each security rule, is a vector including a numeric or binary value representing a security rule.

At S430, it is checked if there is a classification sub-model for a cyber-solution category. If so, execution continues with S440; otherwise, execution continues with S450.

At S440, each output vector is classified using the classification sub-model. Such sub-model may be ready from previous classification of security rules for different products or a classification provided by a user (e.g., a security analyst). The previous classification can be determined based on running a process for generating a classification model on a different set of security rules. The classification sub-model may include a list of 'k' security rules, and for each security rule, an indication whether the rule is classified to a specific security service and engine or not. It should be noted that the number 'k' of security rules is significantly lower than the number of security rules in an attack database. For example, 'k' may be 30 rules, while the number of a security rules in a typical attack database is over 1,000.

In an embodiment, in order to create a classification model that classifies the output vector, first a cross-validation of the classification sub-model is performed. In an example implementation, the cross-validation technique that can be utilized is k-fold cross-validation training and test sets. Generally, in a k-fold cross-validation, the classification sub-module (the rules thereof being taken as an original sample) is randomly partitioned into 'k' equal sized subsamples. One of the 'k' subsamples may be retained as the validation data for testing the model, and the remaining k−1 subsamples are used as training data set. The cross-validation process is then repeated k times (the folds), with each of the k subsamples used exactly once as the validation data. That is, at each fold, a different subsample is used as a test subsample.

In an embodiment, at each fold, the validation of a subsample is performed using a machine learning classification technique. Such classification technique may include, but is not limited to, a linear support vector machine (SVM), a non-linear SVM, a regression tree, a neural network, a support vector machine, and the like. In one embodiment, in addition to the classification, at each fold indicative terms are extracted. Such terms are saved in the vocabulary database. In an embodiment, a weight is assigned to each term, thus each entry in the vocabulary database includes a term and its respective weight.

The classification of the folds will be performed on a small set of security rules which can result in biasing terms that are not distinctively related to a security service and engine. Thus, the classification may result in a high number of false-positives. In an embodiment, in order to improve the first classification attempt, another classification is performed (hereinafter referred to as a "second level classification"). The second level classification attempts to identify indicative terms that were not used during the first level classification, but still may be indicative of a security service. For example, if the indicative term in the first classification was "nmap SCAN", then all rules classified using this term can be classified using a different term likely to be found in such rules, such as "TCP ping" or "ICMP Ping".

In another embodiment, the second level classification may include assigning a score (e.g., in the range [0, 1]) to each rule of the 'k' rules designated in the sub-model. Then, a number 'x' (x>1) of highest scored rules are determined as a service-classified set and a number of 'y' (y>1) of lowest scored rules as a service-unclassified set. The service-engine-classified service-engine-unclassified sets are used to re-train the classifier used in the first level classification.

Execution reaches S450 when a classification sub-model is not available. An initial input seed may be provided for the classification. Such seed includes a limited set of security rules associated with a security service and engine within the service and/or a limited set of rules that are not associated with a security engine. In an example embodiment, the initial input seed is determined by a user (e.g., a security analyst). It should be noted that a number of security rules that would require classification, at S450, are significantly lower than a number of rules in a typical attack database.

At S455, a sub-model is trained using the seed. The training may be performed using a machine learning algorithm, such as decision-trees, SVM-classifiers, and the like. In an embodiment, rules designated in the seed are grouped into training and test sets. The training set is used to the train the model, while the test set is used to evaluate the model's performance. In an embodiment, a k-fold division process is used for training and test sets. The output of S440 or S455 is a preliminary classification model.

At S460, the preliminary classification model is evaluated. In an embodiment, an F-score is computed using a predefined supervised set over each fold separately, and then averaged over all k values separately. The F-score is a measure of a test's accuracy. Typically, an F-score considers both the precision p and the recall r of the test to compute the score. The precision p is a number of correct positive results divided by the number of all positive results, and the recall r is the number of correct positive results divided by the number of positive results that should have been returned. The F-score is between 1 and 0, where 1 is the best and 0 is the worst.

At S470, it is checked if the computed score is above a predefined threshold value (TH) (e.g., 0.95 for F-score). If so, at S480, the preliminary classification model is considered validated and saved in a database. Otherwise, execution continues with S485.

At S485, a reclassification of the preliminary classification model is performed. The reclassification can be performed using the sets of service-classified and service-unclassified of rules mentioned above. The sets can be updated based on the evaluation performed at S470. For example, rules classified with a low score (e.g., F-score between 0 and 0.3, where '0' is "out-category" score) can be added to the un-classified set while rules classified with a high score (e.g., F-score between 0.7 and 1, where '1' is "in-category" score) can be added to the classified set. In addition, during the reclassification, different weights can be reassigned to different terms. In some non-limiting embodiments, a user input may be also provided during the reclassification.

At S490, it is checked if there is an additional attack database to classify. If so, execution continues with S410; otherwise, execution terminates.

Figure 5:
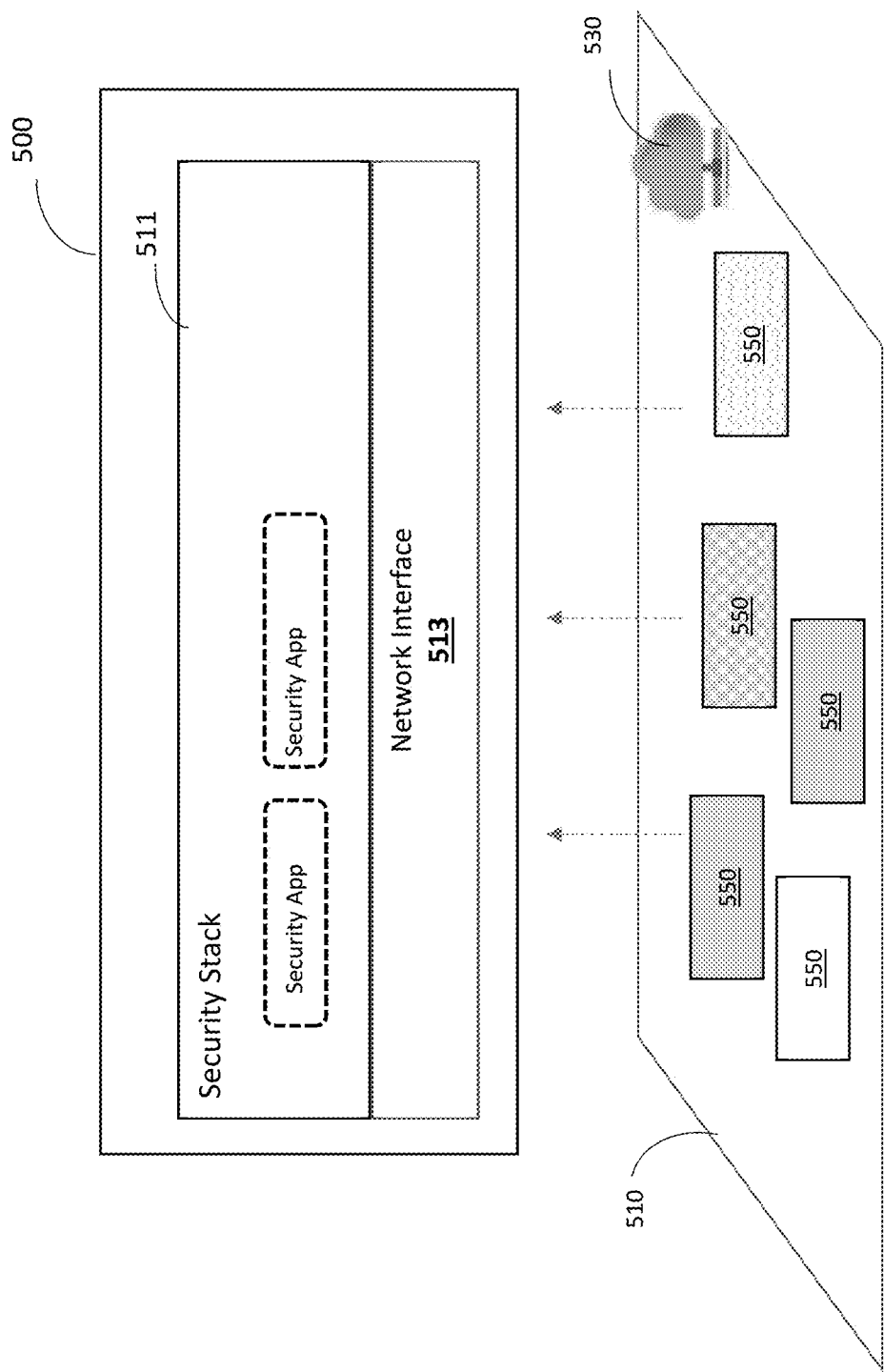
FIG. 5 is a diagram of a cyber-security system utilized to describe the various disclosed embodiments.

FIG. 5 is an example diagram of a cyber-security system 500 in which the classifier can be operated according to one embodiment. The cyber-security system 500 is configured to protect an entity (hereinafter a "protected entity") 530 communicatively connected in a network 510. The cyber security system 500 is also connected to the network 510. The network 510 may be, but is not limited to, a virtualized network, a software defined network (SDN), a hybrid network, a cloud services networks, or any combination thereof. In an embodiment, the cyber-security system 500 is configured to operate in detection, investigation, and mitigation phases.

In an example configuration, the cyber-security system 500 includes a security stack module 511 and a network interface 513. The security stack module 511 is configured to control and execute the various phases to protect the protected entity 530. Specifically, the security stack module 511 is configured to create, control, program, and execute a plurality of security applications or "apps." In an embodiment, the security stack module 511 includes the classifier 100 (not shown in FIG. 5) utilized to classify plurality of attack databases of the various security products to the security services realized through the module 511. The operation of the security stack module 511 is discussed in greater detail herein below with respect to FIG. 6.

The network interface 513 provides an interface layer of the cyber-security system 500. Such communication can be with SDN-based network elements or "legacy" network elements (not shown) in the network 510. The network interface 513 supports communication drivers to allow communication through elements, such as border gateway protocol (BGP) flow specifications, NetConf, command line interfaces (CLIs), NetFlow, middle-box devices drivers (e.g., L4-L7 drivers, DPI device drivers), end point device drivers (mobile, host based security applications), server applications, and so on.

The network interface 513 also interfaces with a plurality of security products 550. Such security products 550 are designed to protect against different cyber threats. Examples for security products are provided below. In an embodiment, the system 500 is configured to orchestrate the operation of the various security products 550 through execution of the security applications. The execution of such application requires signals (or events) generated by the security engines. The security engines require that the various security rules in the security products will be continuously classified correctly into them in real time or near real time, thus the classifier 100 provides in an important role when executing the security applications.

Figure 6:
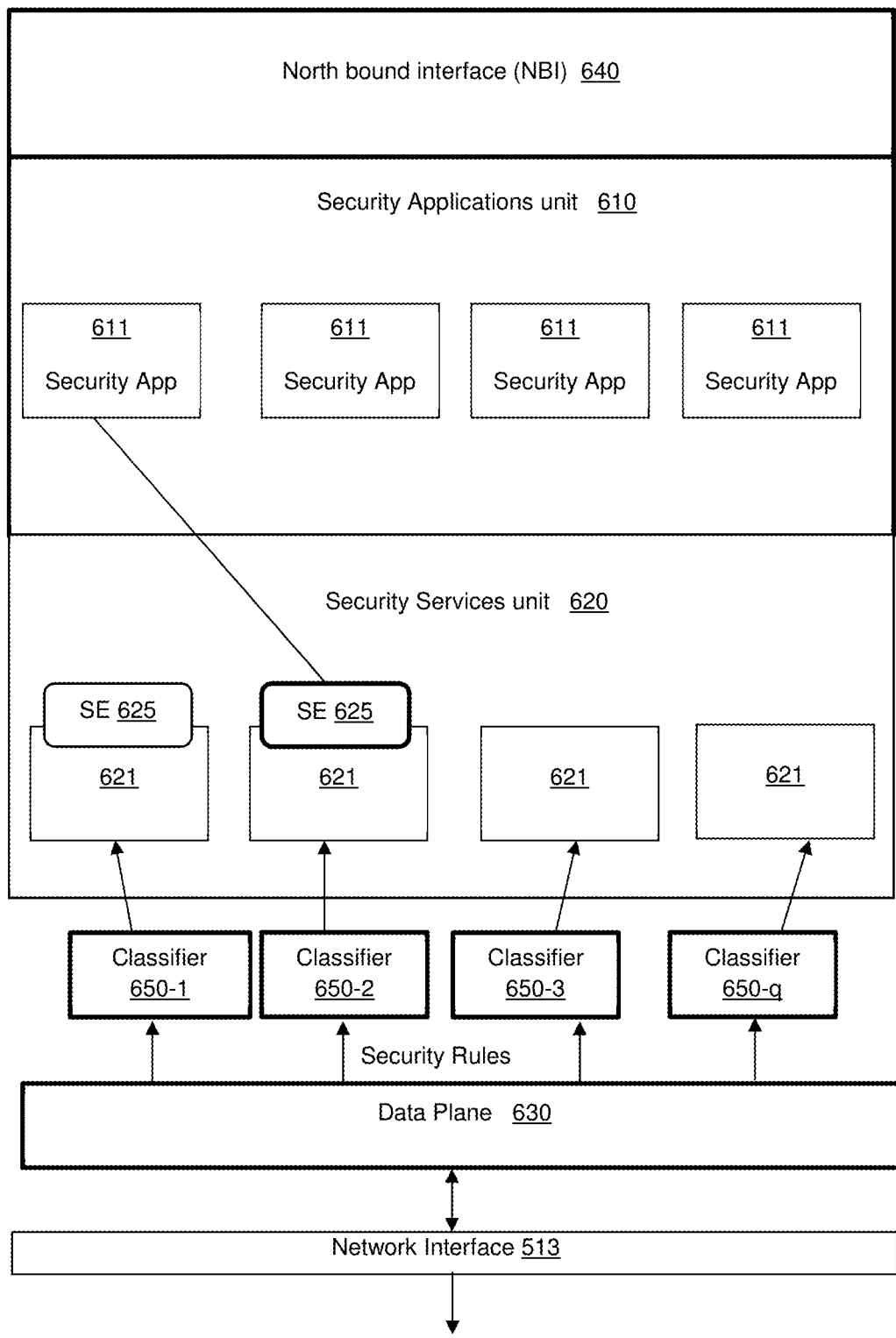
FIG. 6 is a block diagram of a security stack of the cyber-security system.

FIG. 6 shows an example block diagram of the security stack module 511 implemented according to an embodiment. In an example implementation, the security stack module 511 includes the following units: a security applications unit 610, a security services unit 620, a data-plane unit 630, and a northbound interface (NBI) 640. The security stack module 511 includes security services 621 that are reusable across different security applications ("app") 611. Thus, different security applications 611 (each one for a different purpose) can consume the same security services 621 for their own needs.

Specifically, the security applications unit 610 includes security applications 611. Each security application 611 represents a different type of security protection including, for example, ransomware attack campaign detection and mitigation, intelligence gathering detection and mitigation, insider threat detection and mitigation, data-leak, and so on. The modules or rules interfacing with a security application provide the required services and security engines 625, thereby allowing the creation or otherwise updating of a security application according to evolving security needs.

In an embodiment, the security applications unit 610 is preconfigured with a set of security applications 611. Additional security applications 611 can be added and removed from the security applications unit 610 as needed. In an embodiment, all security applications 611 hosted in the security application unit 610 implement pre-defined APIs in order to efficiently communicate with the security services 621.

The security services unit 620 includes different types of security services 621. Each security service 621 is designed to serve one or more security applications 611. The security services 621 are also designed to provide efficient control and data collection over security rules provided by the security products 550. The classification of the security rules into the services 621 and one or more security engines (SEs) 625 of the services is performed by the classifier 100 as discussed in detail above. Each security service 621 may include one or more preconfigured security engines 625.

Following are example security services 621 that can be maintained and executed by the security services unit 620. A first type of security service provides programmable anomaly detection of network activities toward the network elements (e.g., toward routers, switches misuse of bandwidth resources, and so on).

Another type of security service 621 provides programmable anomaly detection of network activities toward the server applications (e.g., Web, mail, FTP, VoIP, on so on). Another type of security service provides programmable detection of users' anomalous activities.

Another type of security service 621 allows for managing and analyzing multiple types of reputation sources (third party intelligence security sources). The service also allows creation of a self-generated reputation database that can become a reputation source for other security applications in the system and for third party security systems. The reputation database maintains reputation information of network entities such as clients and services (sites). Such reputation information may be used to evaluate if these entities can possess a threat. A threat may be, for example, a source of SPAM activities, a command and control server, drop zone servers, website that are known to be phishing sites, sites that includes malware software, and the like.

Another type of security service 621 allows programing advanced challenge-response actions that validate the legitimacy of users' applications. Yet another type of security service 621 allows for control of multiple types of anti-malware sandbox rules in the network (mixing-and-matching the best rules for each task) in order to analyze content such as web objects, mails attachments, executable files, and so on, and to identify anomalous code behavior. This type of service also allows creation and modification of sandbox analysis rules for analysis optimization.

Yet another type of security service 621 generates real-time (RT) attack risk-chain patterns. These real-time attack risk-chain patterns represent network traffic patterns of attacks, such as user-based attacks (e.g., malware generated network traffic activities), server-based attacks (e.g., web scraping network activities, brute-force network activities, etc.) and network-based attacks (e.g., network Distributed Denial of Service (DDoS) attack network activities). These real-time attack risk-chain patterns can be used for real-time mitigation of threats, as well as for reputation and forensic analysis.

Yet another type of security service 621 allows for management of multiple IDS and IPS devices.

Some or all of the services 621 may operate with a security engine 625. A security engines is configured with a set of engine rules, manually or automatically. In some cases a user can modify and program new security engines 625 by defining a new set of engine rules. In an embodiment, a security engine is programmed to continuously generate a score of anomaly (SoA) per user or per user group the security engine analyzes. Each generated SoA may include, but is not limited to, a value and metadata representing the characteristics of anomalous traffic flows such as, e.g., IP addresses, client name, service name, L4 protocol, L7 protocol, L4 port, and so on. High values of generated SoAs reflect unusual user application activity, such as communication with drop points (or drop zone), communication with command and control servers, malware propagation activities, application brute-force, application scans, user-misbehaving applications (e.g., fake applications), and so on. A drop point provides internal and external drop-points/zones that are used as part of advanced information stealth attack campaigns.

It should be noted that programmability of the security stack module 511, as enabled by the architecture of the system 500, allows a user to select different types of security services 621, thereby providing a mix and match capability. Specifically, this capability is achieved by the data plane unit 630 and a network interface module 513 which provides an abstraction layer for all underlining data-plane rules in the network (such as routers, switches, DPI devices, sandbox servers, challenge-response servers, and so on).

Information that is needed for operation of the security services 621 may be retrieved from the data-plane unit 630 and/or from the north bound interface 640. It should be noted that the security services 621 in the security services unit 620 also communicate and interface with the security applications unit 610 (the security applications unit 610 controls and manages the security services 621 in the security services unit 620).

It should be further noted that the security services 621 listed above are merely examples, and that other security services can be utilized in the cyber-security system 600 without departing from the scope of the embodiments disclosed herein. In various non-limiting embodiments, a programming language is provided in order to allow users to create and modify security applications and to create and modify the security engines included in each security service, as per business needs.

The data-plane unit 630 provides central management of the data-plane resources such as routers, switches, middle-box devices, and so on. In an embodiment, the data plane unit 630 allows the security services to retrieve and store the required network and application information from the data plane resources as well as to enforce security network control actions. Various functions provided by the data plane unit 630 include topology discovery, data collection, and traffic copy and redirection services which include traffic distribution (L2, L3 load balancing for scaling out network resources), traffic copying, and so on.

Topology discovery involves interacting with the data-plane network elements, SDN controllers, and orchestration systems in order to retrieve network topology information. This function is important for the topology awareness that is needed by other data-planes' functions as well as security services and applications.

The traffic copy and redirection services are designed to manage all network traffic redirection functions which include, but are not limited to, traffic redirection, smart traffic copying (copy based on L2-L4 traffic filter parameters), traffic distribution, and so on.

The data collection may involve collecting statistics data from probes deployed in the network and storing such statistics. The statistics collection may include, but are not limited to, network-based statistics from network elements; application-based network statistics from DPI resources (including middle-boxes and servers); and user-based statistics from network, DPI, middle boxes, and end-point resources. The collector services normalize the statistical information into a format that can be analyzed by the security services 621 in the security services unit 620.

Also included in the security stack module 511 are a plurality of classifiers 650-1 through 650-*q* connected to the security service unit 620. Each classifier 650 is configured to classify security rules of different products related to the same category of a cyber-solution to a respective security service 621 and its engines 625. Each classifier 650 operates as the classifier 100 discussed in greater detail herein above. It should be noted that one security rule can be classified to one or more security services 621 and engines 625, thus processed by one or more classifiers 650. The access to the security products (550, FIG. 5) is performed through the network interface 513 and the data plane unit 630.

The data-plane unit 630 together with the security services 621 further provides the following functions: management of quality of service (QoS) actions in the network elements, and a set of mitigation functions. The mitigation functions include basic access control list (ACL) services, which are layer-2 to layer-4 access control list services that manage the distributed rules throughout the network elements. Software defined networks, as well as legacy network elements and hybrid networks, may be supported by this service.

Advanced ACL functions possess similar characteristics to basic ACL functions, but can define more granular access rules including application parameters (L7). Specifically, an ACL function can use the generated RT risk-chain pattern from a real-time risk-chain generation service (discussed above) as a blocking rule. It should be noted that risk chain patterns can be used by other services, such as investigation services (IDS/IPS, sandbox, and so on) to investigate specific flows and network entities that are included in the risk-chain pattern.

The ACL function typically operates with DPI network elements for enforcing the application level ACL rules. Service rate-limits manage the QoS rules in the data plane device. Black-hole route function provides an extension of the redirection data-plane services that manage redirection of users into a black-hole. Typically, black-holes are network locations where incoming or outgoing traffic is silently discarded (or "dropped") without informing the source that the data did not reach its intended recipient.

In an embodiment, the data-plane services allow both real-time detection and "near" real-time detection. Real-time detection of attacks is facilitated by feeding the statistics directly from the data-plane collectors, in real-time, to the security services unit 620 without storing the raw stats (i.e., storing only the result in the security services unit 620). In general, the data-plane unit 630 provides all raw information that is required by the security services 621 and controls the network via decisions made by the security services 621 and the security applications 611.

The north bound interface 640 interfaces between the security stack module 511 and one or more external systems (not shown). The external systems may include, for example, third party security analytics systems, security intelligence feeds, security portals, datacenter orchestration control systems, identity management systems, or any other system that can provide information to the security stack module 611. This enables wider context-based security decision making processes. In an embodiment, the interfaces 640 may include standard interfaces, such as CLI, REST APIs, Web user interfaces, as well as drivers that are already programmed for control, configuration and/or monitoring of specific third party systems, and so on.

In an example embodiment, the security services 621 may include, but are not limited to, a network anomaly security service, a user application anomaly security service, an anti-malware security service, a reputation security service, IDS security service, a challenge-response security service, a risk-chain pattern generation security service, an anti-virus (AV) security service and a Web application (WAF) security service.

It should be noted that each of the security applications unit 610, the security services unit 620, the data plane 630, and the north bound interface 640, as well as the security stack module 511, are communicatively interconnected through a predefined set of interfaces and/or APIs. As a result, the cyber-security system 500 is fully programmable and configurable. The interfaces may be designed to be unidirectional, one-to-one bidirectional, or one-to-many bidirectional for flows of information between the various modules and units.

It should be further noted that modules in the cyber-security system 500, the security application unit 610, the security services unit 620, and the data plane 630 in the security stack module 611 are independent. Thus, any changes in one unit or module do not necessarily result in any changes to the other modules.

According to an embodiment, the cyber-security system 500 is designed to activate/deactivate and to correlate between security applications in unit 610 and security services and security engines in the unit 620 in order to define, create, or otherwise program a robust solution for detecting and mitigating attacks against the protected entity. The sequence for activating, deactivating, and correlating the various functions and modules of the cyber-security system 500, is based on one or more workflow rules. In an embodiment, the detection, investigation and/or mitigation functions are performed in the system 500 based on at least one workflow rule defined to handle a certain threat.

At a top level, the correlation model allows each security application to correlate feeds received from other security applications, thereby making the entire security decision-making process more holistic and context-based, i.e., correlating decision outputs from different security application types before making a final security decision.

To this end, each security application may communicate with other security applications and services and security engines by means of a controller (not show) managing the correlation of the different events.

At a lower level, the correlation of events occurs between multiple security services 620 based on signals generated by the respective engines 625. The events are generated in response to a security rule or rules processed by each engine. If the security rule is satisfied, then an event is output. For example, a network scan security decision engine attempts to match an attack signature defined in a security rule to network attributes. If a match is determined, than an event is generated and provided to a security application.

This allows a single security application to make decisions based on multiple services and security engines in order to increase the overall decision accuracy. Further, as each classifier 650 dynamically classifies the rules in the attack databases, it ensures that the security engines 625 operate on the most-updated rules. Therefore, the cyber-security system can adapt to new threats as they are identified.

According to one embodiment, the correlation of various feeds is performed by a set of workflow (or correlation) rules which are processed and applied by a controller of a security application. In an embodiment, the set of workflow rules is defined by the user. In another embodiment, the controller implements a learning mechanism to define or otherwise select a set of correlation rules to execute. The workflow rules are set respective of the attacks that the cyber-security system 500 can handle. That is, in an example implementation, a set of workflow rules is defined for each different type of threat.

Each, some, or all of the modules of the cyber-security system 500 and the various units of the security stack module 511 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating a security rule classification model, comprising:
   receiving at least one security rule from at least one attack database of a first security product of a plurality of different security products;
   normalizing each of the at least one security rule;
   generating a vector for each of the least one normalized security rule;
   classifying each generated vector to a security engine within a security service using a classification sub-model to generate a preliminary classification model, wherein the classification sub-model is provided from previous classification of security rules for a security product of the plurality of different security products that is different than the first security product;

determining a score for the preliminary classification model; and validating the preliminary classification model as the security rule classification model, when the score is over a predefined threshold.

2. The method of claim 1, wherein the preliminary classification model includes: a row vector in which each row element is a score that characterizes a level of association of the at least one security rule to a security engine.

3. The method of claim 1, wherein the vector for each of the at least one security rule is a binary string.

4. The method of claim 1, wherein classifying each generated vector further comprises: mapping the generated vector to a security engine within a security service.

5. The method of claim 1, wherein the mapping is at least one type of: statistical, deterministic, and heuristic-based.

6. The method of claim 1, wherein the score indicates an accuracy of the classification.

7. The method of claim 1, wherein the score indicates a probability that the at least one security rule is correctly mapped to the security engine.

8. The method of claim 1, wherein the classification sub-model includes a list of k security rules, k>1, and for each security rule of the of k security rules an indication whether the rule is classified to a specific security service and engine or is not so classified.

9. The method of claim 1, further comprising:
training the sub-model using an initial seed, wherein the initial seed includes at least one of: a limited set of security rules associated with a security service and engine within the service and a limited set of rules that are not associated with a security engine.

10. The method of claim 1, wherein the score is an F-score.

11. A system for generating a security rule classification model, comprising:

a processing circuitry; and a memory, the memory containing instructions that, when executed by the processing circuitry, configure the system to:

receive at least one security rule from at least one attack database of a first security product of a plurality of different security products;

normalize each of the at least one security rule;

generate a vector for each of the least one normalized security rule;

classify each generated vector to a security engine within a security service using a classification sub-model to generate a preliminary classification model, wherein the classification sub-model is provided from previous classification of security rules for a security product of the plurality of different security products that is different than the first security product;

determine a score for the preliminary classification model; and validate the preliminary classification model as the security rule classification model, when the score is over a predefined threshold.

12. The system of claim 11, wherein the preliminary classification model includes: a row vector in which each row element is a score that characterizes a level of association of the at least one security rule to a security engine.

13. The system of claim 11, wherein the vector for each of the at least one security rule is a binary string.

14. The system of claim 11, wherein the system is further configured to: map the generated vector to a security engine within a security service.

15. The system of claim 11, wherein the mapping is at least one type: statistical, deterministic, and heuristic-based.

16. The system of claim 11, wherein the score indicates an accuracy of the classification.

17. The system of claim 11, wherein the score indicates a probability that the at least one security rule is correctly mapped to the security engine.

18. The system of claim 11, wherein the classification sub-model includes a list of k security rules, k>11, and for each security rule of the of k security rules an indication whether the rule is classified to a specific security service and engine or is not so classified.

19. The system of claim 11, wherein the classification sub-model is trained using an initial seed, wherein the initial seed includes at least one of: a limited set of security rules associated with a security service and engine within the service and a limited set of rules that are not associated with a security engine.

20. The system of claim 11, wherein the score is an F-score.

* * * * *